(12) United States Patent
Fein et al.

(10) Patent No.: US 7,656,290 B2
(45) Date of Patent: Feb. 2, 2010

(54) LOCATION SYSTEM

(76) Inventors: Gene Fein, 760 East St., Lenox, MA (US) 01240; Edward Merritt, 139 Lime Kiln Rd., Lenox, MA (US) 01240

(*) Notice: Subject to any disclaimer, the term of this patent is extended or adjusted under 35 U.S.C. 154(b) by 229 days.

(21) Appl. No.: 11/426,561

(22) Filed: Jun. 26, 2006

(65) Prior Publication Data
US 2007/0296572 A1 Dec. 27, 2007

(51) Int. Cl.
*G08B 1/08* (2006.01)
(52) U.S. Cl. .............. 340/539.13; 340/539.22; 340/572.1; 340/572.7; 340/573.1; 340/407.1; 340/10.1; 340/825.4; 235/375; 235/462.44; 235/462.45; 235/462.46

(58) Field of Classification Search ............ 340/539.13, 340/539.22, 572.1, 572.7, 573.1, 407.1, 10.1, 340/825.4; 235/375, 462.44, 462.45, 462.46
See application file for complete search history.

(56) References Cited

U.S. PATENT DOCUMENTS

| | | | |
|---|---|---|---|
| 5,606,506 A * | 2/1997 | Kyrtsos | 701/207 |
| 2003/0151519 A1* | 8/2003 | Lin | 340/825.19 |
| 2005/0099307 A1* | 5/2005 | Gilfix et al. | 340/573.1 |
| 2006/0144920 A1* | 7/2006 | Fang et al. | 235/375 |
| 2007/0096908 A1* | 5/2007 | Chu et al. | 340/572.1 |
| 2007/0176785 A1* | 8/2007 | Boss et al. | 340/825.19 |

* cited by examiner

*Primary Examiner*—Tai T Nguyen
(74) *Attorney, Agent, or Firm*—Stolowitz Ford Cowger LLP

(57) ABSTRACT

Briefly, in accordance with one or more embodiments, a user may receive guidance information from a guidance support center via a location system.

43 Claims, 5 Drawing Sheets

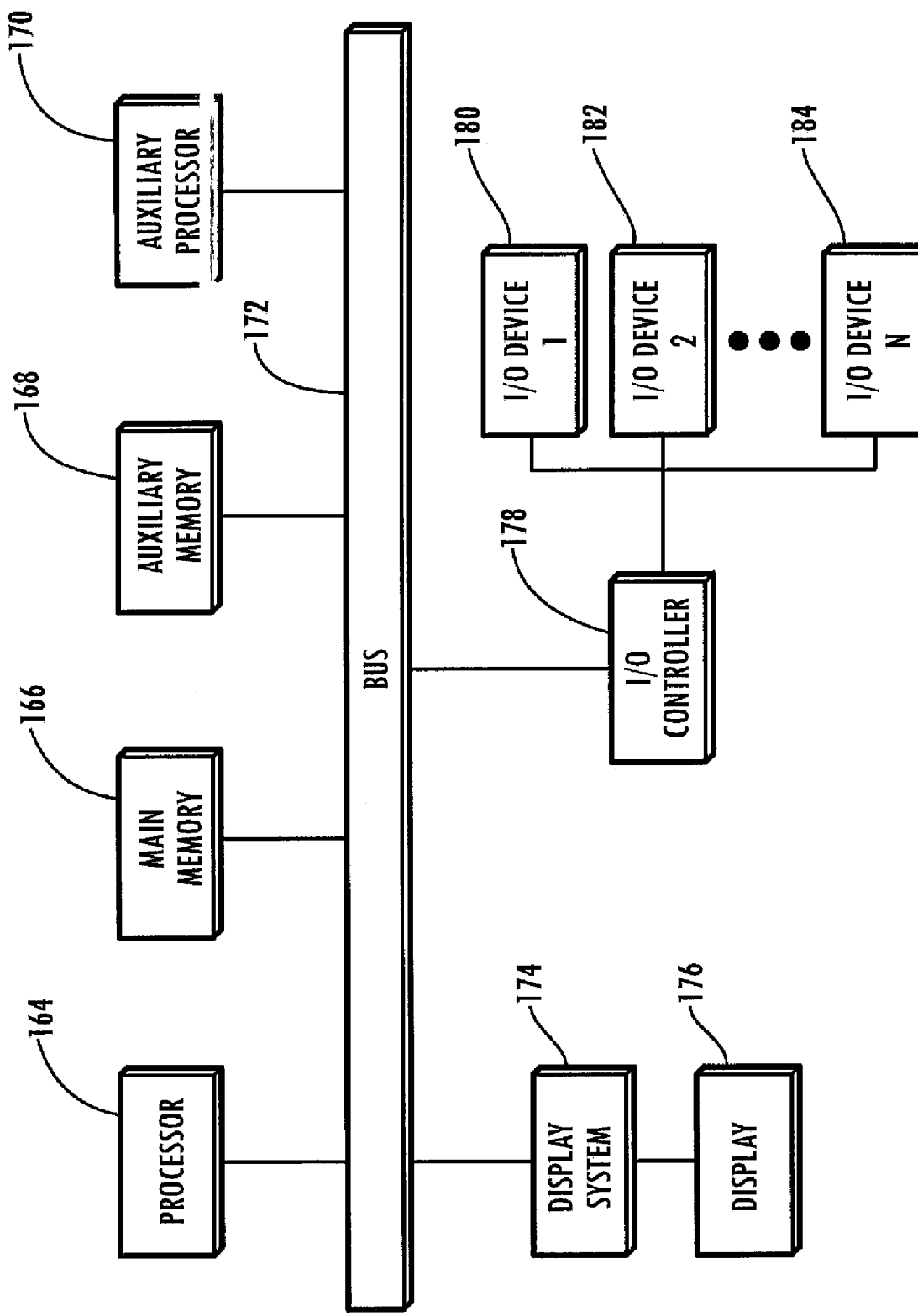

LOCATION SYSTEM

BACKGROUND

People occasionally may desire some form of assistance to locate or verify their route or destination while moving from point-to-point. This desire for assistance may be heightened for the blind or visually impaired versus people with sight, because blind or visually impaired people may be unable or less able to fix their general direction based on visual object, such as, road signs, landmarks, the sun, or stars, for example.

Currently, the blind or visually impaired may rely on guide dogs, human guides, asking people for advice, calling someone via cellular phone, or using an existing support service while moving from point-to-point or from a stationary position. Some support services such as the Personal Navigation and Information System for Users of Public Transport (NOPPA) system in Finland, may operate with automated voice recognition and may provide an automated voice response derived by global positioning system (GPS) data & other mapping data.

The OnStar system provided by General Motors in their vehicles may use GPS and other mapping data to obtain location data for a client inside a car. OnStar may provide live human-to-human voice contact and support so that specific macro and micro data may be exchanged between the client inside the car and the OnStar live support technician.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, may best be understood by reference to the following detailed description when read with the accompanying drawings in which:

FIG. 3 is a block diagram of a location system in use according to one or more embodiments;

FIG. 5 is a block diagram of a location system in accordance with one or more embodiments.

Figure 1:
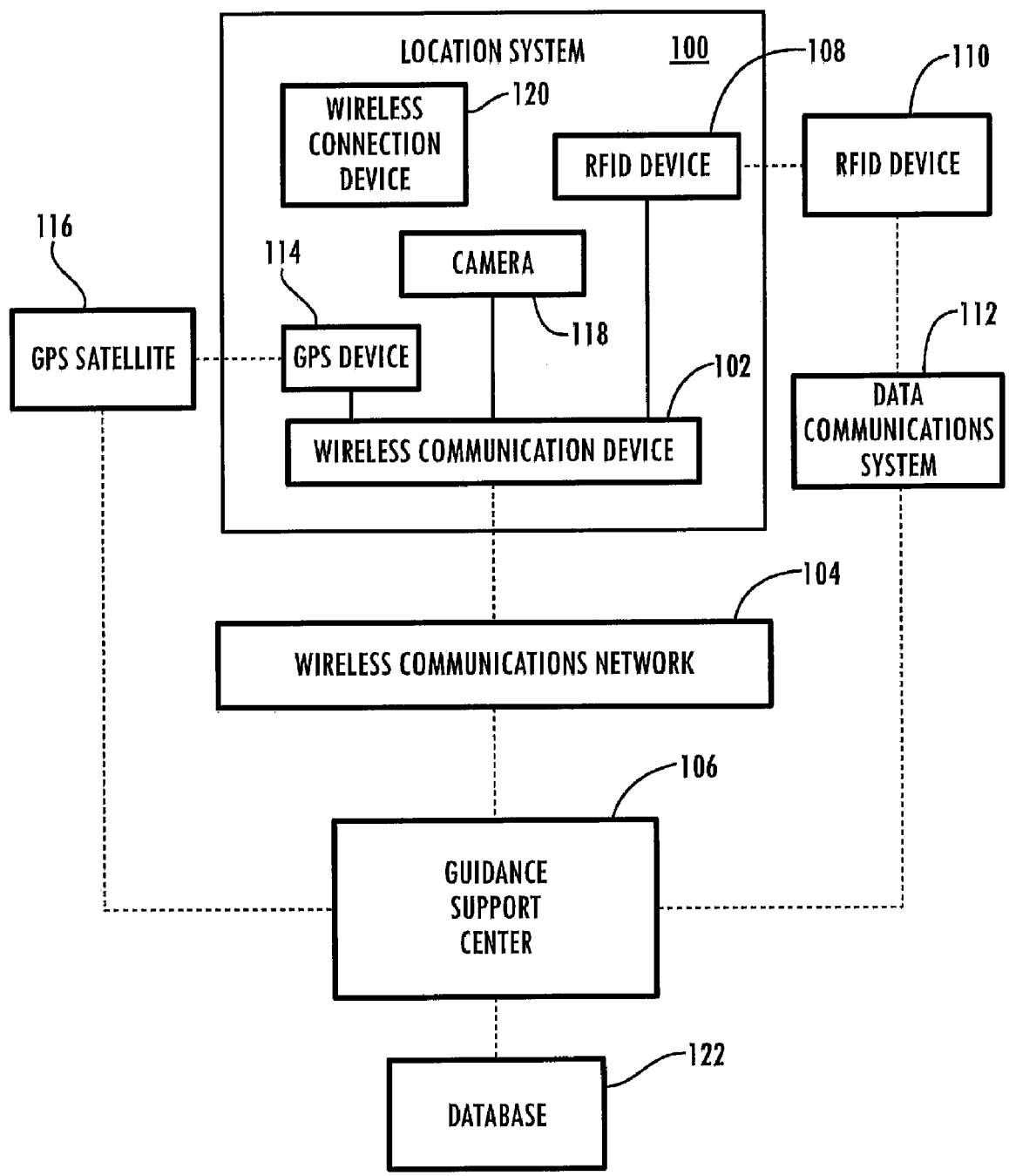
FIG. 1 is a block diagram of a location system in accordance with one or more embodiments.

Reference is made in the following detailed description to the accompanying drawings which form a part hereof wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of the claimed subject matter. It should also be noted that directions and references, for example, up, down, top, bottom, and so on, may be used to facilitate the discussion of the drawings and are not intended to restrict the application of the claimed subject matter. Therefore, the following detailed description is not to be taken in a limiting sense and the scope of the claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description that follows are presented in terms of algorithms, programs and/or symbolic representations of operations on data bits or binary digital signals within a computer memory, for example. These algorithmic descriptions and/or representations may include techniques used in the data processing arts to convey the arrangement of a computer system and/or other information handling system to operate according to such programs, algorithms, and/or symbolic representations of operations.

A program and/or process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Embodiments claimed may include one or more apparatuses for performing the operations herein. These apparatuses may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing device and/or other information handling system.

The processes and/or displays presented herein are not inherently related to any particular computing device and/or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments are not described with reference to any particular programming language. It will be appreciated that a variety of programming languages may be used to implement the teachings described herein.

Embodiments claimed may include software capable of performing one or more of the operations described herein. Although the claimed subject matter is not limited in scope in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions that when executed by a system, such as a computer system, computing platform, or other system, for example, may result in an embodiment of a method in accordance with the claimed subject matter being executed, for example.

In the following description and/or claims, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

Reference throughout this specification to "one embodiment" or "an embodiment" means that a particular feature, structure, or characteristic described in connection with the embodiment is included in at least one embodiment of the claimed subject matter. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Referring to FIG. 1, a block diagram illustrates a location system 100 according to one or more embodiments, although the claimed subject matter is not limited in scope in this respect. Location system 100 may include more and/or fewer components than those shown in FIG. 1. However, generally conventional components may not be shown, for example a battery, a processor, and so on. Illustrated in FIG. 1, location system 100 may include a wireless communication device 102. Wireless communication device 102 may capable of communicating over a wireless communication network 104. Wireless communication network 104 may comprise one or more of the following: a cellular phone network, a two-way radio network, an Internet network, a virtual private broadband network, a peer-to-peer voice over Internet protocol (IP) system, a local area network (LAN), a wireless local area network (WLAN), a wireless wide area network (WWAN), a worldwide interoperability for microwave access network (WiMax), a multiple input multiple output antenna network (MIMO), a time division/domain multiple access network (TDMA), a code division multiple access network (CDMA), and/or a space division multiple access network (SDMA), and/or combinations thereof, according to the particular application. Wireless communication device 102 may be capable of communicating with guidance support center 106. For example, wireless communication device 102 may be capable of transmitting location information to guidance support center 106 via wireless communications network 104. As used herein, the term "location information" may be any data related to location. Examples of location information may include, but are not limited to voice information, text information, Braille information, visual location information, RFID information, coordinate location information, the like, and/or combinations thereof, according to the particular application. Additionally or alternatively, wireless communication device 102 may be capable of receiving guidance information from guidance support center 106 via wireless communications network 104. As used herein, the term "guidance information" may be any data related to guiding a traveler. Examples of guidance information may include, but are not limited to travel directions, destination information, the like, and/or combinations thereof, according to the particular application.

Location system 100 may include a radio frequency identification device 108 (referred to as RFID device 108 hereinafter). As used herein, the term "RFID device" may be any device capable of transferring radio frequency identification information. Examples of RFID devices may include, but are not limited to active RFID devices, passive RFID devices, the like, and/or combinations thereof, according to the particular application. RFID device 108 may be capable of communicating with a second RFID device 110 located adjacent or remote from location system 100 to transfer RFID information between RFID device 108 and RFID device 110. For example, RFID device 108 may include an RFID reader and/or an RFID tag, where RFID reader of RFID device 108 may retrieve RFID information from an RFID tag of RFID device 110 and/or where RFID tag of RFID device 108 may deliver RFID information to RFID reader of RFID device 110. RFID device 108 may be coupled to wireless communication device 102 to be capable of communicating location information, such as RFID information, to guidance support center 106 via wireless communication network 104. Additionally or alternatively, a data communications system 112 may be in communication with RFID device 110 as well as guidance support center 106, so that location system 100 may be capable of communicating location information, such as RFID information, to guidance support center 106 via RFID device 110 and data communications system 112. Additionally or alternatively, location system 100 may be capable of communicating location information, such as voice information, text information, and/or Braille information, to guidance support center 106 via RFID device 110 and data communications system 112. As used herein, the term "data communications system" may be any system capable of data communications. Examples of data communications systems may include, but are not limited to online Network Operations Center (hereinafter NOC), and/or the like, according to the particular application. The location information, such as RFID information, may be used by guidance support center 106 for analysis of location data and/or mapping to help fix the location of the user. RFID device 108 and/or RFID device 110 comprise one example of a location determining system for location system 100, and the scope of the claimed subject matter is not limited in this respect.

Location system 100 may include a global positioning system device 114 (referred to as GPS device 114 hereinafter). As used herein, the term "GPS device" may be any device capable of determining global position, according to the particular application. GPS device 114 may be capable of communicating with a GPS satellite 116 to transfer location information, such as coordinate location information, between GPS device 114 and one or more GPS satellites 116 and/or a constellation of satellites and/or space vehicles and/or ground equipment. GPS device 114 may be coupled to wireless communication device 102 to be capable of communicating location information, such as coordinate location information, to guidance support center 106. Additionally or alternatively, GPS satellite 116 may be in communication with guidance support center 106, so that location system 100 may be capable of communicating location information, such as coordinate location information, to guidance support center 106 via GPS satellite 116. Additionally or alternatively, location system 100 may be capable of communicating location information, such as coordinate location information, to guidance support center 106 via RFID device 110 and data communications system 112. The location information, such as coordinate location information, may be used by guidance support center 106 for analysis of location data and/or mapping to help fix the location of the user. GPS device 114 and/or GPS satellite 116 comprise one example of a location determining system for location system 100, and the scope of the claimed subject matter is not limited in this respect.

Location system 100 may include a camera 118. As used herein, the term "camera" may be any device capable of processing visual location information, including but not limited to picture information, video information, the like, and/or combinations thereof, according to the particular application. Camera 118 may be coupled to wireless communication device 102 to be capable of communicating location information, such as visual location information, to guidance support center 106. Additionally or alternatively, location system 100 may be capable of communicating location information, such as visual location information, to guidance support center 106 via RFID device 110 and data communications system 112. As will be discussed below, camera 118 may be coupled to one or more of the following: a prosthetic eye, a pair of glasses, a necklace, a cellular phone, the like, and/or combinations thereof, according to the particular application. The location information, such as visual location information, may be used by guidance support center 106 for analysis of location data and/or mapping to help fix the location of the user.

Location system 100 may include a wireless connection device 120. As used herein, the term "wireless connection device" may be any device capable of short-range wireless connection between two or more electronic devices. For example wireless connection device 120 may be a Bluetooth connection device, and/or the like, according to the particular application. As will be discussed below, wireless connection device 120 may be capable of being wirelessly connected to one or more of the following electronic devices: wireless communication device 102, RFID device 108, GPS device 114, camera 118, a microphone such as show in FIG. 2, speaker such as shown in FIG. 2, the like, and/or combinations thereof, according to the particular application.

A database 122 may be connected to guidance support center 106. Database 122 may communicate with guidance support center 106 to supply additional information to guidance support center 106. As used herein, the term "additional information" may include, but is not limited to data and/or programs including, but not limited to: public and/or private mapping information, address information, travel distances, travel directions, the like, and/or combinations thereof, although the claimed subject matter is not limited in scope in this respect. Additionally or alternatively, data communications system 112 may communicate with guidance support center 106 to supply additional information to guidance support center 106.

Figure 2:
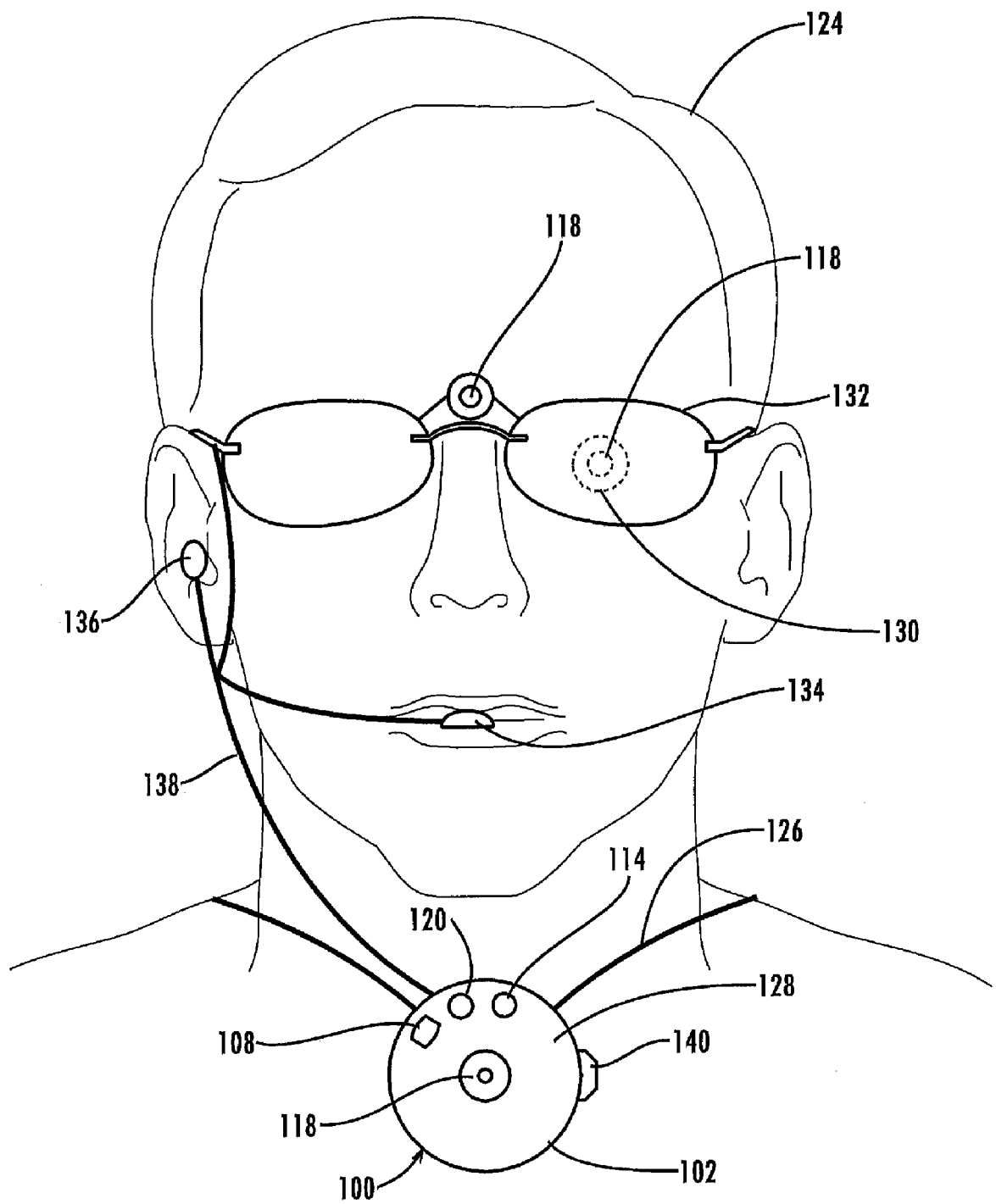
FIG. 2 is an illustration of a location system in accordance with one or more embodiments.
Figure 1:
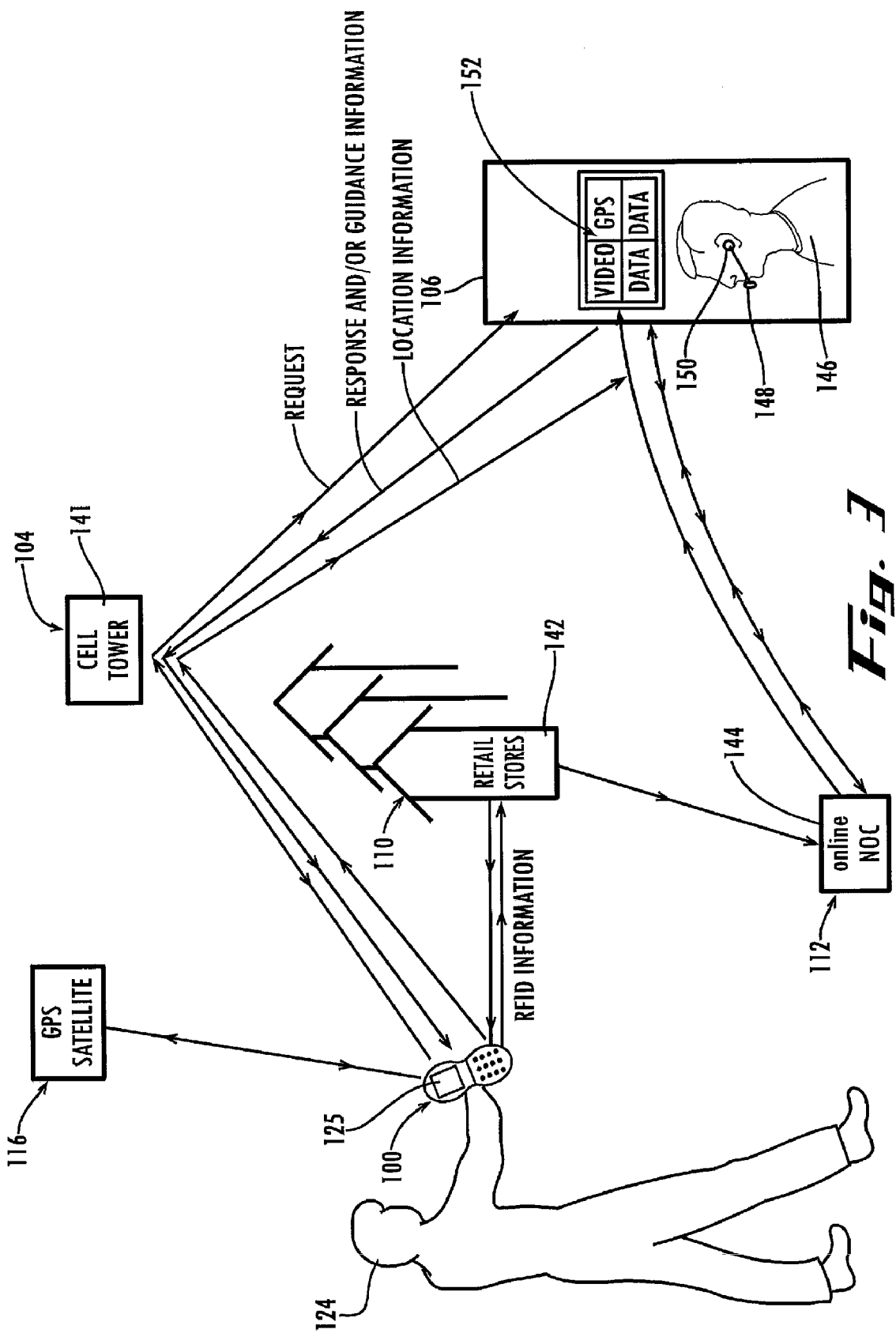

Referring to FIG. 2, an illustration of location system 100 according to one or more embodiments is shown, although the claimed subject matter is not limited in scope in this respect Location system 100 may include more and/or fewer components than those shown in FIG. 2. However, generally conventional components may not be shown, for example a battery, a processor, and so on. Illustrated in FIG. 2, location system 100 may be include a housing 128 that may be capable of being personally portable, such as, for example, being carried and/or worn by a user 124, although the claimed subject matter is not limited in scope in this respect. As used herein the term "personally portable" comprises, but is not limited to, being capable of being carried on and/or by a person. Housing 128 may comprise any number of devices, such as, for example, a hand held device, a wrist worn device, a device worn on belt and/or belt clip, a device coupled to a backpack, and/or the like, or combinations thereof, although the claimed subject matter is not limited in scope in this respect. For example, location system 100 may include a necklace 126 capable of securing at least a portion of location system 100 to user 124. Necklace 126 may hold location system 100 secure to user 124 to prevent location system 100, along with any plugged in attachment devices, from falling to the ground. Necklace 126 may be coupled to housing 128.

Housing 128 may be capable of housing all or a portion of location system 100, such as, for example, wireless communication device 102, RFID device 108, GPS device 114, camera 118, wireless connection device 120, the like, and/or combinations thereof, according to the particular application. Housing 128 may be coupled to wireless communication device 102, where wireless communication device 102 may be capable of communicating between housing 128 and guidance support center 106 via wireless communication network 104. Housing 128 may be coupled to RFID device 108, GPS device 114, camera 118, and/or the like, or combinations thereof, where RFID device 108, GPS device 114, camera 118, and/or the like, or combinations thereof, may be capable of supplying location information of housing 128 to guidance support center 106. Housing 128 may be coupled to wireless connection device 120, where wireless connection device 120 may be capable of short-range wireless connection to one or more electronic devices.

As discussed above, one or more cameras 118 may be coupled to one or more of the following: housing 128 of necklace 126, a prosthetic eye 130, a pair of glasses 132, a cellular phone such as shown, for example, in FIG. 3, and/or the like, or combinations thereof, according to the particular application. Additionally or alternatively, one or more cameras 118 may be coupled to a collar or otherwise coupled to living or robotic devices including but not limited to one or more of the following: guard animals, guide animals (such as a seeing eye dog, for example), other animals, second party guides, third party guide guides, and/or the like, or combinations thereof, according to the particular application. Prosthetic eye 130 may contain an embedded camera 118 so that visual location information captured by camera 118 may be passed to location system 100 for communication to guidance support center 106. Additionally or alternatively, camera 118 may be wirelessly enabled to be capable of short-range wireless connection between two or more electronic devices so as to be positioned in a variety of places.

Location system 100 may include a microphone 134. Microphone 134 may be capable of converting sound waves into an electric current. Additionally or alternatively, microphone 134 may be wirelessly enabled to be capable of short-range wireless connection between two or more electronic devices so as to be positioned in a variety of places. For example, one or more microphones 134 may be coupled to a collar or otherwise coupled to living or robotic devices including but not limited to one or more of the following: guard animals, guide animals (such as a seeing eye dog, for example), other animals, second party guides, third party guides, and/or the like, or combinations thereof, according to the particular application.

Location system 100 may include a speaker 136. Speaker 136 may be capable of converting electrical signals into sounds loud enough to be heard. Additionally or alternatively, speaker 136 may be wirelessly enabled to be capable of short-range wireless connection between two or more electronic devices so as to be positioned in a variety of places. Camera 118, microphone 134, and/or speaker 136 may be coupled to wireless communication device 102 via one or more wires 138 and/or coupled to wireless communication device 102 via wireless connection device 120.

Communications to and/or from location system 100 and/or guidance support center 106 may include audio, text display, graphics display, code, Braille, and/or the like, or combinations thereof. As used herein, the term "code" may include, but is not limited to Morse code and/or the like, according to the particular application. Communications to and/or from location system 100 and/or guidance support center 106 may be conducted via speaker 136, microphone 138, a text display such as the display shown in FIG. 5, graphics display such as the display shown in FIG. 5, a code device such as input/output device show in FIG. 5, and/or a Braille input/output device such as input/output device show in FIG. 5. For example, communications to and/or from location system 100 and/or guidance support center 106 may be conducted via speaker 136, microphone 138, and/or Braille input/output device where user 124 is blind or visually impaired, although the scope of the claimed subject matter is not limited in this respect. Location system 100 and/or guidance support center 106 may be capable of defining input and/or output settings for individual users 124. The defined input and/or output settings may be set at the inception of service and/or may be set and/or altered after the inception of service. For example, defined input and/or output settings may be set to select one of more of audio, text display, graphics display, code, Braille, and/or the like for communications to and/or from location system 100 and/or guidance support center 106.

Location system 100 may include a call button 140. Call button 140 may be capable of triggering a request for service to be sent from location system 100 to guidance support center 106. Call button 140 may be manually pressed and/or voice activated, such as, for example, voice activated from a command registered on microphone 134. As used herein the term "request" comprises, but is not limited to, requests by user 124 for mapping information, address information, travel distances destination information, travel directions, the like, and/or combinations thereof, although the claimed subject matter is not limited in scope in this respect.

Referring to FIG. 3, an illustration of location system 100 in use according to one or more embodiments is shown, although the claimed subject matter is not limited in scope in this respect. The operating environment of location system 100 may include more and/or fewer components than those shown in FIG. 3. However, generally conventional components may not be shown. Illustrated in FIG. 3, location system 100 may be capable of being carried or worn by user 124, such as, for example, a blind or visually impaired user, although the claimed subject matter is not limited in scope in this respect. As shown, location system 100 may comprise a cellular phone 125, although the claimed subject matter is not limited in scope in this respect. Location system 100 may be capable of communicating with guidance support center 106 over wireless communication network 104, such as, for example, a cell tower 141 of a cellular phone network to send a request and/or location information to guidance support center 106, although the claimed subject matter is not limited in scope in this respect.

RFID device 110 maybe located adjacent or remote from location system 100 at one or more third party locations such as retail stores 142, for example, although the claimed subject matter is not limited in scope in this respect. RFID information may be transferred between location system 100 and guidance support center 106. For example, RFID device 110 and/or retail store 142 may be capable of communicating with guidance support center 106 over data communications system 112, such as, for example, an online NOC 144 to send RFID information to guidance support center 106, although the claimed subject matter is not limited in scope in this respect. Additionally or alternatively, location system 100 may be capable of communicating with guidance support center 106 over wireless communication network 104, such as, for example, cell tower 141 of cellular phone network to send RFID information to guidance support center 106, although the claimed subject matter is not limited in scope in this respect.

Location system 100 may be capable of communicating with GPS satellite 116 to communicating location information, such as coordinate location information, to guidance support center 106. For example, location system 100 may be capable of communicating with guidance support center 106 over cell tower 141 send coordinate location information to guidance support center 106, although the claimed subject matter is not limited in scope in this respect. Additionally or alternatively, GPS satellite 116 may be in communication with guidance support center 106, so that location system 100 may be capable of communicating location information, such as coordinate location information, to guidance support center 106 via GPS satellite 116. For example, cellular phone 125 may be GPS enabled so as to be locatable via GPS software installed at guidance support center 106. The coordinate location information may be read from GPS satellite 116 to guidance support center 106 via a satellite transmission system (not shown), and/or via a location transmission sent back from satellite 116 to cellular phone 125 which is then relayed through NOC 144 of data communications system 112 and/or cell tower 141 of wireless communication network 104. Coordinate location information may be mapped via a GPS software program located at guidance support center 106, although the claimed subject matter is not limited in scope in this respect.

At guidance support center 106, an operator 146 may communicate with user 124, such as, for example, via a microphone 148 and/or a speaker 150, although the claimed subject matter is not limited in scope in this respect. Additionally or alternatively, operator 146 may review request and/or location information regarding user 124. For example, operator 146 may hear request information from user 124 via speaker 150 and/or may view request information from user 124 on a screen 152, such as, for example, requests by user 124 for mapping information, address information, travel distances destination information, travel directions, the like, and/or combinations thereof, although the claimed subject matter is not limited in scope in this respect. Additionally or alternatively, operator 146 may view location information regarding user 124 on screen 152, such as, for example, text information, Braille information, visual location information, RFID information, coordinate location information, the like, and/or combinations thereof, although the claimed subject matter is not limited in scope in this respect. Based at least in part on location information and/or additional information from one or more databases 122 (as shown in FIG. 1), additional information from NOC 144 of data communications system 112, and/or additional information locally stored at guidance support center 106, operator 146 may analyze location information and/or perform mapping to help fix the location of user 124 to supply a response and/or guidance information to location system 100. Location system 100 may be capable of receiving guidance information from guidance support center 106 based at least in part on location information via cell tower 141 of wireless communications network 104 and/or via NOC 144 of data communications system 112, although the claimed subject matter is not limited in scope in this respect. For example, the guidance information may be supplied as live support to user 124. As used herein the term "live support" comprises, but is not limited to, instantaneous and/or time delayed communication from a person, including, but not limited to audio, text, and/or Braille answers back and forth between user 124 and operator 146 on a live basis.

Figure 4:
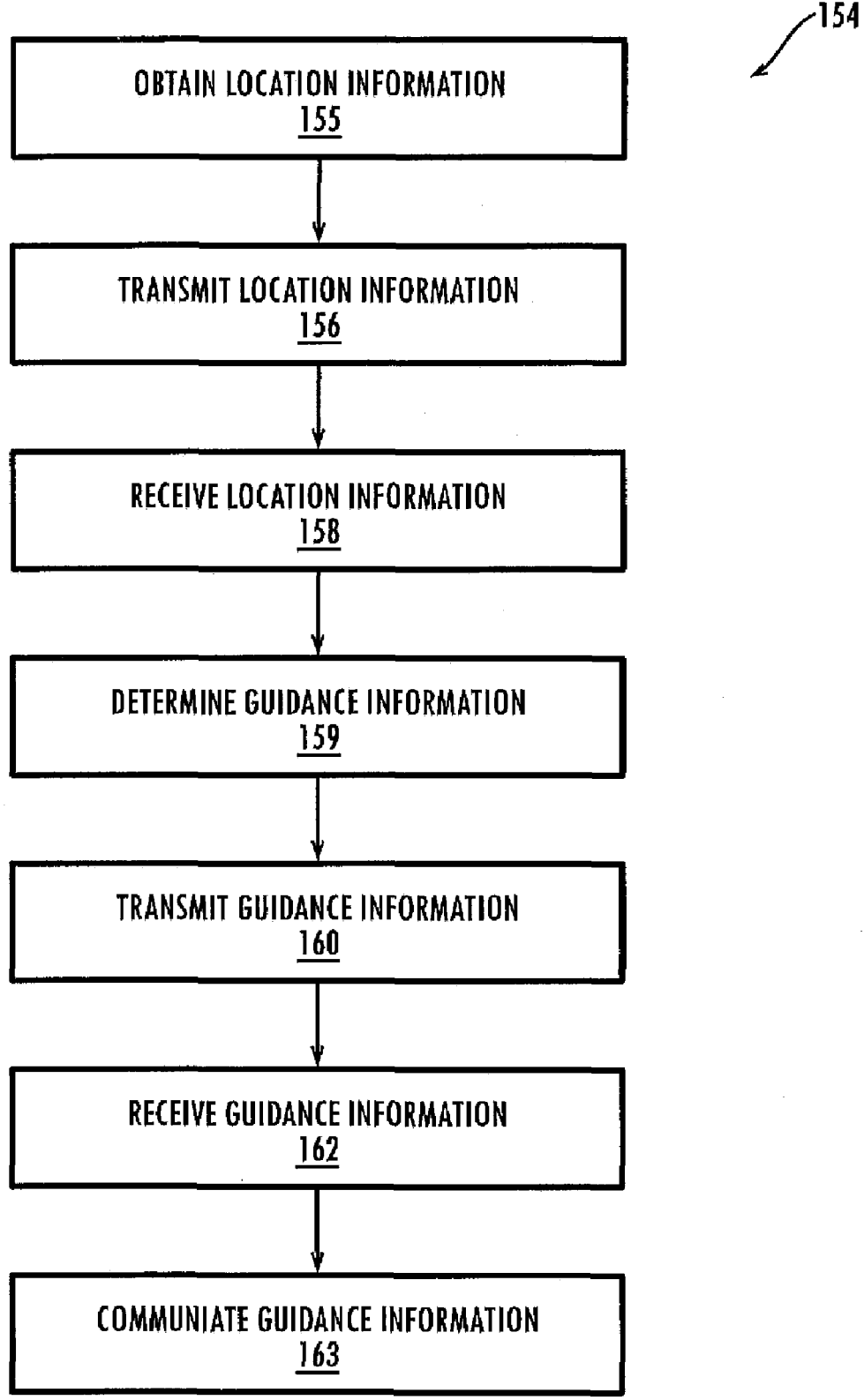
FIG. 4 is a flow diagram of a procedure for operating a location system in accordance with one or more embodiments.

Referring now to FIG. 4, a flow diagram illustrates an example procedure for obtaining guidance information, in accordance with one or more embodiments, although the claimed subject matter is not limited in scope in this respect. The procedure illustrated in FIG. 4 may be used to perform one or more guidance operations with a location system, such as location system 100 of FIG. 1, for example, although the claimed subject matter is not limited in this respect. Additionally, although procedure 154 as shown in FIG. 4 comprises one particular order of blocks, the order in which the blocks are presented does not necessarily limit the claimed subject matter to any particular order. Likewise, intervening blocks shown in FIG. 4 and/or additional blocks not shown in FIG. 4 may be employed and/or blocks shown in FIG. 4 may be eliminated, without departing from the scope of the claimed subject matter.

Procedure 154 depicted in FIG. 4 may in alternative embodiments be implemented in software, hardware and/or firmware, and may comprise discrete operations. As illustrated, location system 100 may obtain location information including, but are not limited to voice information, text information, Braille information, visual location information, RFID information, coordinate location information, the like, and/or combinations thereof, of a user, according to the particular application, at block 155. At block 156, location system 100 may transmit location information to guidance support center 106. Additionally or alternatively, location system 100 may share, utilize, sort, format, synthesize, and/or transform the location information. For example, location system 100 may share the location information with another device, such as a second location system 100 of a second user 124, via a wireless connection device such as wireless connection device 120 show in FIG. 1, although the scope of the claimed subject matter is not limited in this respect.

At block 158, guidance support center 106 may receive location information. Additionally or alternatively, guidance support center 106 may share, utilize, sort, format, synthesize, and/or transform the location information. For example, guidance support center 106 may store the location information at the guidance support center 106 and/or at a database, such as database 122 show in FIG. 1, although the scope of the claimed subject matter is not limited in this respect. Guidance support center 106 may share the location information back to location system 100, such as supplying the location information to user 124 via audio, text display, graphics display, code, and/or Braille communications, although the scope of the claimed subject matter is not limited in this respect. As another example, guidance support center 106 may synthesize the location information with additional information such as data and/or programs including, but not limited to: public and/or private mapping information, address information, travel distances, travel directions, the like, and/or combinations thereof, although the claimed subject matter is not limited in scope in this respect. Guidance support center 106 may use the synthesized location information and additional information to create a broader and greater understanding of the public and/or private mapping information and/or a greater understanding of data sub-groupings of the additional information, although the claimed subject matter is not limited in scope in this respect. For example, guidance support center 106 may synthesize the RFID information and/or coordinate location information with additional information to create a broader and greater understanding of the public and/or private mapping information, although the claimed subject matter is not limited in scope in this respect.

At block 159, guidance support center 106 may determine guidance information for a user based at least in part on the location information. At block 160, guidance support center 106 may transmit guidance information to location system 100. Additionally or alternatively, guidance support center 106 may share, utilize, sort, format, synthesize, and/or transform the guidance information. For example, guidance support center 106 may store the guidance information at the guidance support center 106 and/or at a database, such as database 122 show in FIG. 1, although the scope of the claimed subject matter is not limited in this respect. Guidance support center 106 may share the guidance information with location system 100, such as supplying the guidance information to user 124 via audio, text display, graphics display, code, and/or Braille communications, although the scope of the claimed subject matter is not limited in this respect. Additionally or alternatively, guidance support center 106 may share the guidance information and/or location information to user 124 via devices other than location system 100. For example, guidance support center 106 may share the guidance information and/or location information to user 124 via home phone, cellular phone, personal data assistant (PDA), broadband-type devices, satellite-type devices such as televisions and/or personal computers, and/or the like, or combinations thereof, although the scope of the claimed subject matter is not limited in this respect. Gathered location information, guidance information, and/or additional information may be stored at guidance support center 106, stored at database 122, and/or stored at location system 100; additionally or alternatively, gathered location information, guidance information, and/or additional information may be shared via unrestricted and/or restricted access, such as via file transfer protocol (FTP) sites and/or peer-to-peer based access, for example.

At block 162, location system 100 may receive guidance information from guidance support center 106. At block 163, location system 100 may communicate the guidance information to a user. Additionally or alternatively, location system 100 may share, utilize, sort, format, synthesize, and/or transform the guidance information. For example, location system 100 may share the guidance information with another device via a wireless connection device such as wireless connection device 120 show in FIG. 1, although the scope of the claimed subject matter is not limited in this respect.

An example procedure for obtaining guidance information, in accordance with one or more embodiments, may combine live support for user 124 located outside of a car, from a combination of voice information, text information, Braille information, visual location information, RFID information, coordinate location information, mapping information, address information, travel distances, and/or travel directions. For example, directions may be given to a blind or visually impaired user 124 orally by operator 146 based upon a call request from blind or visually impaired user 124. Blind or visually impaired user 124 may be walking down a street and feel in need, for whatever reason, of directions to a destination point. User 124 may call guidance support center 106. For example, user 124 may call guidance support center 106 with a one touch dial feature on location system 100, such as call button 140 and/or on a one touch dial feature on cellular phone 125 to be connected to guidance support center 106. As the call is connected to guidance support center 106, the available data relating to the position of user 124, such as location information, may be synchronized on screen 152 for operator 146. Operator 146 may answer the call with a personalized greeting based upon the matching user 124 phone number identification. Operator 146 may ask how he or she can be of service and/or user 124 may request directions to destination point "B", for example. Operator 146 may then look at the data available on screen 152, such as location information and/or mapping information, for example. Operator 146 may look at the coordinate location information which may pinpoint user 124 at least within a two block radius. Operator 146 may look at a live camera feed from camera 118 of user 124 to notice specific retail location "X" within view, for example. RFID device 108 of user 124 may trigger a "hit" on a series of RFID device 110 locations stationed on specific street "Y" heading west, for example. With the preceding location information, operator 146 may make a conclusion and speak, text, and/or Braille the subsequent advice to user 124. For example, operator 146 may speak, text, and/or Braille "in approximately 20 yards you will be at the corner of "Y" and "Z" street, take a left at the corner and follow "Z" street heading south for 45 yards." Using one or more public and/or private mapping databases, operator 146 may see that there is a large statue 30 yards down "Z" street, and may speak, text, and/or Braille "after 30 yards there will be a large statue positioned on the edge of the sidewalk just to your right as you pass by, continue 15 feet and your destination is on your left, ok?" User 124 may speak, text, and/or Braille "yes" as a reply and operator 146 may reply "please call back anytime and thank you." The support call may then be terminated.

Another example procedure for obtaining guidance information, in accordance with one or more embodiments, may include a similar process as discussed above, except that the question posed from user 124 may be more open ended, such as, "can you find a good Indian restaurant around here?" A similar process of giving directions to the Indian restaurant may then take place where operator 146 may locate the best Indian restaurant based upon the available database information and relevant city guides at the disposal of operator 146, such as via NOC 144 of data communications system 112, for example, although the claimed subject matter is not limited in scope in this respect.

Referring now to FIG. 5, a block diagram of location system 100 in accordance with one or more embodiments will be discussed. Location system 100, as shown in FIG. 1 and/or in FIG. 5, may be utilized to tangibly embody a computer program and/or graphical user interface by providing hardware components on which the computer program and/or graphical user interface may be executed, for example to execute procedure 154 of FIG. 5. Such a computer program and/or machine readable instructions may be tangibly stored on a computer and/or machine readable medium such as a compact disk (CD), digital versatile disk (DVD), flash memory device, hard disk drive (HDD), and so on. As shown in FIG. 5, location system 100 may be controlled by processor 164. Processor 164 may comprise a central processing unit such as a microprocessor or microcontroller for executing programs, performing data manipulations and controlling the tasks of location system 100. Communication with processor 164 may be implemented via bus 172 for transferring information among the components of location system 100. Bus 172 may include a data channel for facilitating information transfer between storage and other peripheral components of location system 100. Bus 172 further may provide a set of signals utilized for communication with processor 164, including, for example, a data bus, an address bus, and/or a control bus. Bus 172 may comprise any bus architecture according to promulgated standards, for example industry standard architecture (ISA), extended industry standard architecture (EISA), micro channel architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on, although the scope of the claimed subject matter is not limited in this respect.

Other components of location system 100 may include, for example, main memory 166, and/or auxiliary memory 168. Location system 100 may further comprise auxiliary processing processor 170, which may be another processor, a digital signal processor, and so on. Main memory 166 may provide storage of instructions and data for programs to be executed by processor 164. Main memory 166 may be, for example, semiconductor-based memory such as dynamic random access memory (DRAM) and/or static random access memory (SRAM), and/or the like. Other semi-conductor-based memory types may include, for example, synchronous dynamic random access memory (SDRAM), Rambus dynamic random access memory (RDRAM), ferroelectric random access memory (FRAM), and so on. Auxiliary memory 168 may be utilized to store instructions and/or data that are to be loaded into main memory 166 before execution. Auxiliary memory 168 may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memory 168 also may include any type of non-semiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well. Location system 100 may optionally include auxiliary processor 170 which may be an auxiliary processor to manage input/output, an auxiliary processor to perform floating point mathematical operations, a digital signal processor and/or any special-purpose microprocessor having an architecture suitable for fast execution of signal processing algorithms, a back-end processor and/or any slave-type processor subordinate to processor 164, an additional microprocessor and/or controller for dual and/or multiple processor systems, and/or a coprocessor and/or additional processor. Such auxiliary processors may be discrete processors and/or may be arranged in the same package as processor 164, for example in a multicore and/or multithreaded processor; however, the scope of the claimed subject matter is not limited in these respects.

Location system 100 further may include display system 174 for connecting to display 176, and further may include input/output (I/O) controller 178 to connect to one or more I/O devices including, for example, I/O device 180, I/O device 182, up to an Nth I/O device, I/O device 184. Display system 174 may comprise a video display adapter having components for driving display 176, including, for example, video memory, a buffer, and/or a graphics engine. Such video memory may be, for example, video random access memory (VRAM), synchronous graphics random access memory (SGRAM), windows random access memory (WRAM), and/or the like. Display 176 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth. Input/output controller 178 may comprise one or more controllers and/or adapters to prove interface functions between one or more of I/O device 180, I/O device 182, and/or I/O device 184. For example, input/output controller 178 may comprise a serial port, parallel port, universal serial bus (USB) port, and IEEE 1394 serial bus port, infrared port, network adapter, printer adapter, radio-frequency (RF) communications adapter, universal asynchronous receiver-transmitter (UART) port, and/or the like, to interface between corresponding I/O devices such as a keyboard, mouse, trackball, touchpad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, and/or the like. Input/output controller 178 and/or I/O device 180, I/O device 182, and/or I/O device 184 may provide and/or receive analog and/or digital signals to communicate between location system 100 and external devices, networks, and/or information sources. Input/output controller 178 and/or I/O device 180, I/O device 182, and/or I/O device 184 may implement industry promulgated architecture standards, including, for example, Ethernet IEEE 802 type standards, such as IEEE 802.3 for broadband and/or baseband networks, IEEE 802.3z for Gigabit Ethernet, IEEE 802.4 for token passing bus networks, IEEE 802.5 for token ring networks, IEEE 802.6 for metropolitan area networks and/or the like, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. Location system 100 of FIG. 5 is merely one example of a location system and/or computing platform and the scope of the claimed subject matter is not limited in this respect.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

What is claimed is:

1. An apparatus, comprising:
    a wireless communication device configured to communicate with a guidance support center via a wireless communication network;
    an RFID reader configured to supply RFID location information read from an RFID tag to the guidance support center;
    a camera configured to supply visual location information of an area around the camera to the guidance support center; and
    a GPS device configured to supply GPS location information of the wireless communication device to the guidance support center;
    wherein the wireless communication device is configured to receive information that provides guidance to a destination from the guidance support center based at least in part on the RFID location information, the visual location information, the GPS location information, or combinations thereof.

2. The apparatus of claim 1, further comprising a personally portable housing for at least one of the wireless communication device, the camera, the GPS device or the RFID reader.

3. The apparatus of claim 2, further comprising a security necklace configured to secure at least a portion of the housing.

4. The apparatus of claim 1, wherein the camera is coupled a housing, a prosthetic eye, a pair of glasses, a necklace, a cellular phone, a guide animal collar, a guard animal collar, a camera necklace, a robotic device or combinations thereof.

5. The apparatus of claim 1, further comprising a wireless connection device configured to provide short-range wireless connection to one or more electronic devices.

6. The apparatus of claim 5, wherein the one or more electronic devices include the wireless communication device, the RFID reader, the camera, the GPS device, a microphone, a speaker, or combinations thereof.

7. The apparatus of claim 1, further comprising a call button configured to directly communicate with the guidance support center upon activation.

8. The apparatus of claim 1, further comprising:
    a speaker in communication with the wireless communication device; and
    a microphone in communication with the wireless communication device, wherein the apparatus is configured to directly call the guidance support center when the microphone receives a voice recognized command.

9. A method, comprising:
    obtaining one or more of RFID information from a RFID tag reader of a RFID tag, GPS information from a GPS transponder, visual location information from a camera of an area around the camera, or combinations thereof;
    transmitting, via a wireless communication device, the RFID information, the GPS information, the visual location information, or combinations thereof, to a guidance support center; and
    receiving at a personally portable device information to provide guidance with respect to a destination from the guidance support center based at least in part on the transmitted RFID information, the GPS information, the visual location information, or combinations thereof;
    wherein the guidance information received is in a format comprising audio, text display, graphics display, code, Braille, or combinations thereof.

10. The method of claim 9, further comprising:
    obtaining coordinate location information of the personally portable device; and
    transmitting the coordinate location information of the personally portable device to the guidance support center;
    wherein the guidance information received from the guidance support center based at least in part on the coordinate location information.

11. The method of claim 9, wherein the guidance information is received as live support.

12. The method of claim 9, further comprising transmitting the data in Braille format to live support at the guidance support center in response to receiving the guidance information, wherein the format of the received guidance information comprises Braille.

13. The method of claim 9, wherein the guidance information comprises one or more of the following: travel directions, destination information, or combinations thereof.

14. The method of claim 9, further comprising sharing, utilizing, sorting, formatting, synthesizing, transforming, or combinations thereof, one or more of the RFID information, the GPS information, the visual location information, the guidance information, or combinations thereof.

15. The method of claim 9, wherein the camera is coupled to a prosthetic eye, a pair of glasses, a guide animal collar, a guard animal collar, a camera necklace, a robotic device, or combinations thereof.

16. The method of claim 9, further comprising:
communicating with the guidance support center upon receipt of either a voice activated command, or a signal initiated by activation of a call button in communication with the wireless communication device.

17. A wearable apparatus, comprising:
means for obtaining RFID information from an RFID tag read by an RFID reader means;
means for obtaining GPS information from an RFID transponder means;
means for obtaining visual location information from a camera means;
means for transmitting the RFID information, the GPS information, and the visual location information to a guidance support center;
means for receiving guidance information relative to a destination from the guidance support center based at least in part on the RFID information, the GPS information, the visual location information, or combinations thereof; and
means for communicating the received guidance information as voice data, Braille data, or combinations thereof.

18. The wearable apparatus of claim 17, wherein the wearable apparatus is personally portable.

19. The wearable apparatus of claim 17, wherein the means for transmitting includes means for wireless communication.

20. The wearable apparatus of claim 17, wherein the guidance information comprises travel directions, destination information, or combinations thereof.

21. The wearable apparatus of claim 17, further comprising:
means for interactive communication with an operator associated with the guidance support center.

22. The wearable apparatus of claim 17, further comprising:
means to directly communicate with the guidance support center upon receipt of a voice activated command.

23. The wearable apparatus of claim 17, further comprising:
means to directly communicate with the guidance support center upon receipt of a signal from a single call button.

24. A method, comprising:
receiving RFID information from a location system of a mobile device;
receiving visual location information from a camera of an area around the mobile device;
determining guidance information relative to a destination for the mobile device based at least in part on the RFID information, the visual location information or combinations thereof; and
transmitting the guidance information to the mobile device.

25. The method of claim 24, further comprising:
receiving coordinate location information from the location system;
wherein the guidance information is determined for the mobile device based at least in part on the coordinate location information prior to transmitting the guidance information to the mobile device.

26. The method of claim 24, wherein the guidance information includes live support.

27. The method of claim 24, further comprising receiving the RFID information, the visual location information, or combinations thereof, of the mobile device at the guidance support center via a wireless communication device.

28. The method of claim 24, wherein the guidance information includes travel directions, destination information, or combinations thereof.

29. The method of claim 24, further comprising sharing, utilizing, sorting, formatting, synthesizing, transforming, or combinations thereof, one or more of the guidance information, the visual location information the RFID information, or combinations thereof.

30. The method of claim 24, wherein the camera is coupled to a prosthetic eye, a pair of glasses, a guide animal collar, a guard animal collar, a camera necklace, a robotic device, or combinations thereof.

31. The method of claim 24, further comprising:
responding to a call request with live support, wherein the location system receives the call request as either a voice activated command, or a signal initiated by depression of a single call button.

32. A guidance support center, comprising:
means for receiving one or more of RFID information from an RFID tag reader and visual location information from a camera of an area around the camera wherein the RFID tag reader and the camera comprise a location system of a mobile apparatus;
means for analyzing at least portions of the RFID information, the visual location information, or a combination thereof to provide guidance to a destination for the mobile apparatus based at least in part on the RFID information, the visual location information, or combinations thereof; and
means for transmitting the guidance information to the mobile apparatus as voice data, Braille data, or combinations thereof.

33. The guidance support center of claim 32, further comprising:
means for receiving coordinate location information from the location system; and
means for determining the guidance information for the mobile apparatus based at least in part on the coordinate location information.

34. The guidance support center of claim 32, wherein the means for receiving the RFID information and the visual location information from the location system of the mobile apparatus comprises means for wireless communication.

35. The guidance support center of claim 32, wherein the guidance information includes travel directions, destination information, or combinations thereof.

36. An apparatus, comprising:
a wireless communication device configured to communicate with a guidance support center via a wireless communication network;
a camera configured to supply visual location information of an area around the wireless communication device to the guidance support center; and
an RFID reader configured to supply RFID location information of an RFID tag to the guidance support center;
wherein the wireless communication device is configured to receive information to provide guidance to a destination from the guidance support center based at least in part on the visual location information or the RFID location information.

37. The apparatus of claim 36, comprising a personally portable housing for at least the wireless communication device.

38. The apparatus of claim 37, further comprising a security necklace configured to secure at least a portion of the housing to a user.

39. The apparatus of claim 36, wherein the camera is coupled to a housing, a prosthetic eye, a pair of glasses, a necklace, a cellular phone, a guide animal, a guard animal, a robotic device, or combinations thereof.

40. The apparatus of claim 36, further comprising a GPS device configured to supply GPS location information of the wireless communication device to the guidance support center, wherein the GPS location information includes coordinate location information, and wherein the information to provide the guidance to the destination is based at least in part on the GPS location information.

41. The apparatus of claim 36, further comprising a wireless connection device coupled to a housing, wherein the wireless connection device is configured to provide short-range wireless connection to one or more electronic devices including the wireless communication device, the RFID reader, the camera, a GPS device, a microphone, a speaker, or combinations thereof.

42. The apparatus of claim 37, wherein the wireless communication device is configured for interactive communication with an operator associated with the guidance support center.

43. The apparatus of claim 36, further comprising:
a speaker in communication with the wireless communication device; and
a microphone in communication with the wireless communication device, wherein the apparatus is configured to directly communicate with the guidance support center when the microphone receives a voice recognized command.

* * * * *

UNITED STATES PATENT AND TRADEMARK OFFICE
CERTIFICATE OF CORRECTION

PATENT NO. : 7,656,290 B2  Page 1 of 1
APPLICATION NO. : 11/426561
DATED : February 2, 2010
INVENTOR(S) : Fein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 380 days.

At column 14, line 9, please replace "GPS device" with --GPS device,--.
At column 14, line 13, please replace "coupled" with --coupled to--.
At column 14, line 56, please replace "center" with --center is--.
At column 16, line 7, please replace "device" with --device,--.
At column 16, line 15, please replace "location information" with --location information,--.
At column 16, line 28, please replace "receiving one or more of" with --receiving--.
At column 18, line 8, please replace "37," with --36,--.

Signed and Sealed this

Sixteenth Day of November, 2010

David J. Kappos
*Director of the United States Patent and Trademark Office*